O. M. SMITH.
INSTRUMENT FOR MEASURING THE TURBIDITY OF LIQUIDS.
APPLICATION FILED JULY 28, 1916.
1,232,989.
Patented July 10, 1917.
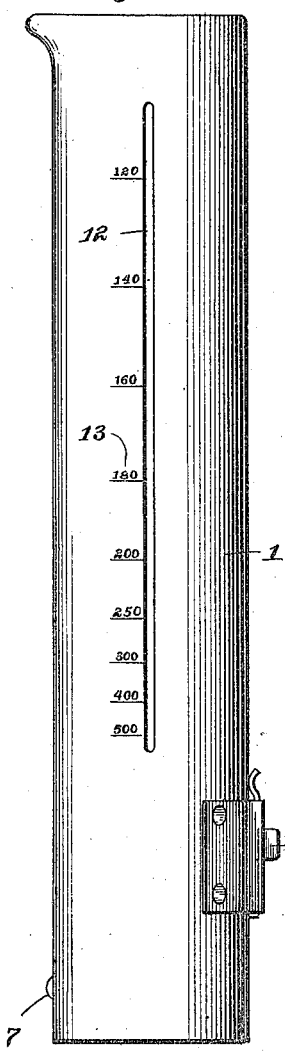
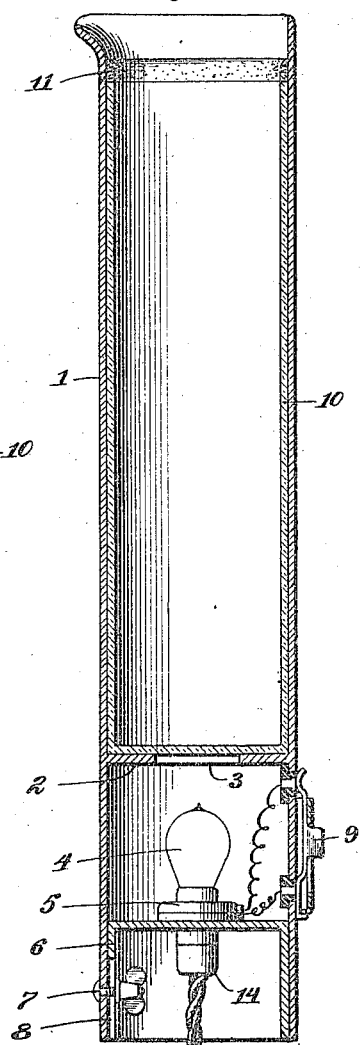
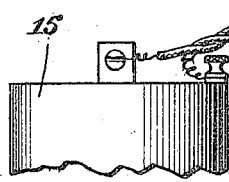
Inventor
Otto M. Smith,
By Victor J. Evans
Attorney
Witnesses
C. F. Rudolph
Wm R. Smith

UNITED STATES PATENT OFFICE.

OTTO M. SMITH, OF LITTLE ROCK, ARKANSAS.

INSTRUMENT FOR MEASURING THE TURBIDITY OF LIQUIDS.

1,232,989.　　　　　　Specification of Letters Patent.　　Patented July 10, 1917.

Application filed July 28, 1916. Serial No. 111,879.

*To all whom it may concern:*

Be it known that I, OTTO M. SMITH, a citizen of the United States, residing at Little Rock, in the county of Pulaski and State of Arkansas, have invented new and useful Improvements in Instruments for Measuring the Turbidity of Liquids, of which the following is a specification.

This invention relates to an instrument for measuring the turbidity of liquids, and it is constructed to accomplish this result by the use of a suitable supported electric bulb.

The primary object of the invention is the use of an electric source of light of constant intensity so as to insure accurate readings.

An object of the invention is the novel manner of associating the glass tube with the other elements of the instrument so that a new tube can be readily inserted in case of breakage of a tube.

A further object of the invention is the provision of an instrument which may be carried conveniently about the person and by means of which the turbidity of liquids may be determined under all weather conditions.

Besides the above my invention is distinguished in the use of a casing having graduation marks and inclosing the glass tube for protecting the latter, while at the same time preventing the necessity of having the graduation marks upon the glass tube.

With these and other objects in view the invention will be better understood from the following detailed description taken in connection with the accompanying drawing, wherein—

Figure 1 is a side elevation of the instrument.

Fig. 2 is a vertical sectional view thereof, and

Fig. 3 is a cross sectional view.

Referring to the drawing, the numeral 1 designates a cylindrical casing open at both ends and supporting at an intermediate point a plate 2 having a centrally arranged opening 3 that is positioned in alinement with an electric bulb 4. The electric bulb 4 is arranged in a socket 5 supported in a sleeve 6 adjustably mounted within the casing and held in any of its adjusted positions by means of a bolt 7 rigidly supported by the casing and movable in the slot 8 formed in the sleeve. A switch 9 is arranged exteriorly of the casing and has the usual connection with the socket 5.

Resting upon the plate 2 is a transparent tube 10 shown in this particular instance as composed of glass. This tube 10 rests upon the plate 2 and is held associated with the casing by means of sealing wax 11 or other adhesive material or mechanical means. For viewing the tube 10 from the exterior of the instrument I form in the casing 1 a longitudinal slot 12 and arranged adjacent the slot is a series of graduation marks 13.

For completing my invention I provide a plug 14 having connection with a source of current 15 and adapted to be inserted into the socket 5.

In the operation of the device liquid is poured into the tube 10 until the filament of the bulb 4 is no longer visible. When this takes place, the graduation marks upon the casing corresponding to the level of the liquid within the tube is observed which gives the turbidity of the liquid.

From the foregoing description it should be apparent that I provide a device which is admirably adapted for the purpose for which it is intended, that the device is simple, durable and efficient of construction and may be manufactured and sold at a comparatively low cost.

What I claim is:

1. An instrument for measuring the turbidity of liquid comprising a casing having a longitudinal extending slot, a transparent tube supported by said casing and having its length visible through said slot, and electric illuminating means supported by the casing below said tube.

2. An instrument for measuring the turbidity of liquid comprising a casing having a longitudinal extending slot and graduation marks along the slot, a transparent tube supported by said casing and having its length visible through said slot, and illuminating means supported by the casing below said tube.

3. An instrument for measuring the turbidity of liquid comprising a casing having a longitudinal extending slot and graduation marks along the slot, a glass tube inclosed by said casing and visible through the slots thereof, an electric bulb supported by the casing directly below the bottom of said tube, means for adjusting said bulb, and a switch for said bulb arranged upon the exterior surface of said casing.

In testimony whereof I affix my signature.

OTTO M. SMITH.

Copies of this patent may be obtained for five cents each, by addressing the "Commissioner of Patents, Washington, D. C."